US012639749B2

(12) United States Patent
Zhuang et al.

(10) Patent No.: US 12,639,749 B2
(45) Date of Patent: May 26, 2026

(54) RESIDUAL NEURAL NETWORKS FOR ANOMALY DETECTION

(71) Applicant: Visa International Service Association, San Francisco, CA (US)

(72) Inventors: Zhongfang Zhuang, San Jose, CA (US); Michael Yeh, Newark, CA (US); Wei Zhang, Fremont, CA (US); Javid Ebrahimi, Redwood City, CA (US)

(73) Assignee: Visa International Service Association, San Francisco, CA (US)

( * ) Notice: Subject to any disclaimer, the term of this patent is extended or adjusted under 35 U.S.C. 154(b) by 819 days.

(21) Appl. No.: 18/013,350

(22) PCT Filed: Jun. 22, 2021

(86) PCT No.: PCT/US2021/038329

§ 371 (c)(1),
(2) Date: Dec. 28, 2022

(87) PCT Pub. No.: WO2022/005797

PCT Pub. Date: Jan. 6, 2022

(65) Prior Publication Data

US 2023/0252557 A1 Aug. 10, 2023

Related U.S. Application Data

(60) Provisional application No. 63/046,904, filed on Jul. 1, 2020.

(51) Int. Cl.
G06N 3/08 (2023.01)
G06N 3/04 (2023.01)
(Continued)

(52) U.S. Cl.
CPC ............. G06Q 40/00 (2013.01); G06N 3/044 (2023.01); G06N 3/082 (2013.01)

(58) Field of Classification Search
CPC ...... G06N 3/044; G06N 3/0443; G06N 3/045; G06N 3/0455; G06N 3/04; G06N 3/0464;
(Continued)

(56) References Cited

U.S. PATENT DOCUMENTS 11,034,357 B2 * 6/2021 Lakshmi Narayanan ...................
G06T 7/11
11,157,782 B2 * 10/2021 Bathen ................... G06N 3/084
(Continued)

FOREIGN PATENT DOCUMENTS

CN 109522317 A 3/2019

OTHER PUBLICATIONS

Bolanos et al., "Egocentric Video Description based on Temporally-Linked Sequences", Nov. 10, 2017, arXiv.com, pp. 1-19 (Year: 2019).*
(Continued)

*Primary Examiner* — Paulinho E Smith
(74) *Attorney, Agent, or Firm* — The Webb Law Firm

(57) ABSTRACT

Systems, methods, and computer program products train a residual neural network including a first fully connected layer, a first recurrent neural network layer, and at least one skip connection for anomaly detection. The at least one skip connection directly connects at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network.

20 Claims, 8 Drawing Sheets

(51) Int. Cl.

| | | |
|---|---|---|
| *G06N 3/044* | (2023.01) | |
| *G06N 3/082* | (2023.01) | |
| *G06Q 40/00* | (2023.01) | |

(58) Field of Classification Search

CPC .. G06N 3/0475; G06N 3/0495; G06N 3/0499;
G06N 3/08; G06N 3/082; G06N 3/0895;
G06N 3/09; G06N 3/091; G06N 3/092;
G06N 3/094; G06N 3/096; G06N 3/098;
G06N 3/0985

See application file for complete search history.

(56) References Cited

U.S. PATENT DOCUMENTS

| | | | | |
|---|---|---|---|---|
| 11,797,844 | B2 * | 10/2023 | Bruss | G06N 20/00 |
| 12,056,729 | B2 * | 8/2024 | Das | G06Q 30/0215 |
| 12,307,740 | B2 * | 5/2025 | Ibrahim | G06N 3/04 |
| 2011/0047044 | A1 | 2/2011 | Wright et al. | |
| 2017/0323101 | A1 * | 11/2017 | Langton | H04L 63/1433 |
| 2019/0042947 | A1 | 2/2019 | Turner et al. | |
| 2019/0236454 | A1 * | 8/2019 | Fok | G06N 3/045 |
| 2021/0142168 | A1 * | 5/2021 | Kushnir | G06N 3/084 |
| 2021/0350375 | A1 * | 11/2021 | Li | G06N 3/0455 |
| 2022/0327544 | A1 * | 10/2022 | Venturelli | G06N 3/04 |
| 2023/0154210 | A1 * | 5/2023 | Huang | G06V 10/242 |
| | | | | 382/103 |

OTHER PUBLICATIONS

Zhang et al., "Highway Long Short Term Memory RNNs for Distant Speech Recognition", Jan. 11, 2016, arxIV, pp. 1-5. (Year: 2016).*

Srivastava et al., "Highway Networks", Nov. 3, 2015, arXiv.com, pp. 1-6 (Year: 2015).*

He et al., "Deep Residual Learning for Image Recognition", Proceedings of the IEEE Conference on Computer Vision and Pattern Recognition, 2016, pp. 770-778.

Huang et al., "CoDetect: Financial Fraud Detection with Anomaly Feature Detection", IEEE Access, Mar. 2018, pp. 19161-19174, vol. 6.

Guo et al., "Entity Embeddings of Categorical Variables", 2016, pp. 1-9.

Shorten, "Introduction to ResNets", Towards Data Science, Jan. 2019, pp. 1-9.

Talo et al., "Convolutional Neural Networks for Multi-Class Brain Disease Detection Using MRI Images", Computerized Medical Imaging and Graphics, 2019, pp. 1-25.

Bolanos et al., "Egocentric video description based on temporally-linked sequences", Journal of Visual Communication and Image Representation, Elsevier, 2017, pp. 205-216, vol. 50, No. 2.

* cited by examiner

100

Transaction Processing Network 101

300

302 → Obtain training data

304 → Train residual neural network including fully connected layer, recurrent neural network layer, and at least one skip connection 306 → Provide trained residual neural network 308 → Obtain input data 310 → Process input data using trained residual neural network to generate output data

Skip Connection

Skip Connection

RESIDUAL NEURAL NETWORKS FOR ANOMALY DETECTION

CROSS REFERENCE TO RELATED APPLICATIONS

This application is the United States national phase of International Application No. PCT/US2021/038329 filed Jun. 22, 2021, and claims priority to U.S. Provisional Patent Application No. 63/046,904, filed Jul. 1, 2020, the disclosures of which are hereby incorporated in their entirety by reference.

BACKGROUND

1. Technical Field

This disclosure relates to residual neural networks and, in some non-limiting embodiments or aspects, to residual neural networks for anomaly detection.

2. Technical Considerations

Neural networks have been widely used in both academics and industry. For example, neural networks have been used for applications ranging from recommending restaurants to detecting network intrusion. By stacking layers of relatively simple networks and adjusting weights therein, deep learning models are capable of learning to remember a pattern from a training dataset and utilizing that memory in future tasks. For example, in a deep learning model for fraud detection, the model may remember the patterns of both regular transactions as well as fraudulent transactions from training. This memory is useful in production when real fraudulent transactions are being processed by the model.

However, a vanishing gradient problem may be encountered when training neural network models. Neural networks may be trained based on backpropagating gradients and adjusting parameters within the whole or part of the neural network. The backpropagation process is built on the chain rule in calculus. When a gradient is close to zero, neural networks are no long capable of computing the gradient and the new parameters inside the neural networks.

A solution to the problem of vanishing gradients is building intra- or inter-layer residual connections, where some connections are "bypassed" or "skipped" to allow gradients to have a stronger effect on other parts of the network. This design of neural networks with residual connections is called a residual neural network or ResNet.

Residual neural networks are widely used for image recognition tasks. These residual neural networks stack many convolutional neural networks (CNNs), which are relatively easy to train and do not care about sequence, to process images represented as numerical data. However, these residual neural networks used for image detection are not suitable for use in applications that use categorical data and/or that include a relatively larger amount of normal transactions than anomalous transactions. For example, in a fraud detection problem, a majority of transactions may be normal or non-fraudulent transactions, and a minority of transactions may be fraudulent transactions that are treated by neural networks as noise and may be not represented through the neural networks. Accordingly, there is a need in the art for improving residual neural networks for anomaly detection.

SUMMARY

Accordingly, provided are improved systems, devices, products, apparatus, and/or methods for training, providing, and/or using a residual neural network for anomaly detection.

According to some non-limiting embodiments or aspects, provided is a computer-implemented method including: obtaining, with at least one processor, training data; and training, with at least one processor, a residual neural network including a first fully connected layer, a first recurrent neural network layer, and at least one skip connection, the at least one skip connection directly connecting at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, the residual neural network producing output data based on at least one of (i) an output of the first other layer and (ii) an output of the second other layer; and modifying, using a loss function of the residual neural network that depends on the output data, one or more parameters of the residual neural network.

According to some non-limiting embodiments or aspects, provided is a system including: one or more processors programmed and/or configured to: obtain training data; and train a residual neural network including a first fully connected layer, a first recurrent neural network layer, and at least one skip connection, the at least one skip connection directly connecting at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, the residual neural network producing output data based on at least one of (i) an output of the first other layer and (ii) an output of the second other layer; and modifying, using a loss function of the residual neural network that depends on the output data, one or more parameters of the residual neural network.

According to some non-limiting embodiments or aspects, provided is a computer program product including at least one non-transitory computer-readable medium including program instructions that, when executed by at least one processor, cause the at least one processor to: obtain training data; and train a residual neural network including a first fully connected layer, a first recurrent neural network layer, and at least one skip connection, the at least one skip connection directly connecting at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, the residual neural network producing output data based on at least one of (i) an output of the first other layer and (ii) an output of the second other layer; and modifying, using a loss function of the residual neural network that depends on the output data, one or more parameters of the residual neural network.

Further non-limiting embodiments or aspects are set forth in the following numbered clauses:

Clause 1: A computer-implemented method comprising: obtaining, with at least one processor, training data; and training, with at least one processor, a residual neural network including a first fully connected layer, a first recurrent neural network layer, and at least one skip connection, wherein the at least one skip connection directly connects at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, wherein the residual neural network produces output data based on at least one of (i) an output of the first other layer and (ii) an output of the second other layer; and modifying, using a loss function of the residual neural network that depends on the output data, one or more parameters of the residual neural network.

Clause 2: The computer-implemented method of clause 1, wherein the training data includes categorical data, numerical data, and embedding data, wherein the residual neural network further includes a categorical input layer, a numerical input layer, an embedding input layer, and a concatenation layer, and wherein training the residual neural network includes: processing, with the categorical input layer, the categorical data to produce categorical features; processing, with the numerical input layer, the numerical data to produce numerical features; processing, with the embedding input layer, the embedding data to produce embedding features; processing, with the concatenation layer, the categorical features, the numerical features, and the embedding features to produce a concatenated feature vector; and processing, with the first fully connected layer, the concatenated feature vector.

Clause 3: The computer-implemented method of clauses 1 or 2, wherein the residual neural network further includes a dropout layer downstream of the first recurrent neural network layer in the residual neural network, and wherein training the residual neural network includes: processing, with the dropout layer, the output of the first recurrent neural network layer.

Clause 4: The computer-implemented method of any of clauses 1-3, wherein the residual neural network further includes another fully connected layer as an output layer downstream of each other layer in the residual neural network, and wherein training the residual neural network includes: processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

Clause 5: The computer-implemented method of any of clauses 1-4, wherein the at least one skip connection includes (i) a first skip connection that directly connects the output of the first fully connected layer to the first other layer downstream of the first recurrent neural network layer in the residual neural network and (ii) a second skip connection that directly connects the output of the first recurrent neural network layer to the second other layer downstream of the second recurrent neural network layer in the residual neural network, wherein the first other layer includes the second recurrent neural network layer, wherein the second other layer includes a second fully connected layer, wherein the first preceding layer includes a first dropout layer between the first recurrent neural network layer and the second recurrent neural network layer, wherein the second preceding layer includes a second dropout layer between the second recurrent neural network layer and the second fully connected layer, and wherein training the residual neural network further includes: processing, with the first dropout layer, the output of the first recurrent neural network layer; processing, with the second recurrent neural network layer, an output of the first dropout layer and the output of the first fully connected layer received via the first skip connection; processing, with the second dropout layer, an output of the second recurrent neural network layer; and processing, with the second fully connected layer, an output of the second dropout layer and the output of the first recurrent neural network layer received via the second skip connection, wherein the residual neural network produces the output data based on an output of the second fully connected layer.

Clause 6: The computer-implemented method of any of clauses 1-5, wherein the at least one skip connection directly connects the output of the first fully connected layer to the first other layer downstream of the first recurrent neural network layer in the residual neural network, wherein the first other layer includes a second fully connected layer, wherein the residual neural network further includes a first dropout layer between the first recurrent neural network layer and the second recurrent neural network layer, wherein the first preceding layer includes a second dropout layer between the second recurrent neural network layer and the second fully connected layer, and wherein training the residual neural network further includes: processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first fully connected layer received via the at least one skip connection, wherein the residual neural network produces the output data based on an output of the second fully connected layer.

Clause 7: The computer-implemented method of any of clauses 1-6, wherein the at least one skip connection directly connects the output of the first fully connected layer to the first other layer downstream of the first recurrent neural network layer in the residual neural network, wherein the first other layer includes the second recurrent neural network, wherein the first preceding layer includes a first dropout layer, wherein the residual neural network further includes a second fully connected layer downstream of the second recurrent neural network and a second dropout layer between the second recurrent neural network and the second fully connected layer, and wherein training the residual neural network further includes: processing, with the first dropout layer, the output of the first recurrent neural network layer; processing, with the second recurrent neural network layer, an output of the first dropout layer and the output of the first fully connected layer received via the at least one skip connection; processing, with the second dropout layer, an output of the second recurrent neural network layer; and processing, with the second fully connected layer, an output of the second dropout layer, wherein the residual neural network produces the output data based on an output of the second fully connected layer.

Clause 8: The computer-implemented method of any of clauses 1-7, wherein the at least one skip connection directly connects the output of the first recurrent neural network layer to the second other layer downstream of the second recurrent neural network layer in the residual neural network, wherein the second other layer includes a second fully connected layer, wherein the residual neural network further includes a first dropout layer between the first recurrent neural network and the second recurrent neural network, wherein the second preceding layer includes a second dropout layer, and wherein training the residual neural network further includes: processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first recurrent neural network layer received via the at least one skip connection, wherein the residual neural network produces the output data based on an output of the second fully connected layer.

Clause 9: The computer-implemented method of any of clauses 1-8, wherein the at least one skip connection directly connects the output of the first fully connected layer to the first other layer downstream of the first recurrent neural network layer in the residual neural network, wherein the first other layer includes a second fully connected layer, wherein the residual neural network further includes a first dropout layer between the first recurrent neural network layer and the second fully connected layer, wherein first recurrent neural network layer is the only recurrent neural network in the residual neural network, and wherein training the residual neural network further includes: processing, with the first dropout layer, the output of the first recurrent neural network layer; and processing, with the second fully connected layer, an output of the first dropout layer and the output of the first fully connected layer received via the at least one skip connection, wherein the residual neural network produces the output data based on an output of the second fully connected layer.

Clause 10: The computer-implemented method of any of clauses 1-9, further comprising: providing, with at least one processor, the trained residual neural network; obtaining, with at least one processor, input data; and processing, with at least one processor, using the trained residual neural network, the input data to generate output data.

Clause 11: The computer-implemented method of any of clauses 1-10, wherein the input data includes a request to authorize a transaction between a merchant and an account holder on an account issued by an issuer, and wherein the output data includes a prediction of whether the transaction is a fraudulent transaction.

Clause 12: A computing system comprising: one or more processors programmed and/or configured to: obtain training data; and train a residual neural network including a first fully connected layer, a first recurrent neural network layer, and at least one skip connection, wherein the at least one skip connection directly connects at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, wherein the residual neural network produces output data based on at least one of (i) an output of the first other layer and (ii) an output of the second other layer; and modifying, using a loss function of the residual neural network that depends on the output data, one or more parameters of the residual neural network.

Clause 13: The computing system of clause 12, wherein the training data includes categorical data, numerical data, and embedding data, wherein the residual neural network further includes a categorical input layer, a numerical input layer, an embedding input layer, and a concatenation layer, and wherein the one or more processors are further programmed and/or configured to the residual neural network by: processing, with the categorical input layer, the categorical data to produce categorical features; processing, with the numerical input layer, the numerical data to produce numerical features; processing, with the embedding input layer, the embedding data to produce embedding features; processing, with the concatenation layer, the categorical features, the numerical features, and the embedding features to produce a concatenated feature vector; and processing, with the first fully connected layer, the concatenated feature vector.

Clause 14: The computing system of clauses 12 or 13, wherein the residual neural network further includes a dropout layer downstream of the first recurrent neural network layer in the residual neural network, and wherein the one or more processors are further programmed and/or configured to the residual neural network by: processing, with the dropout layer, the output of the first recurrent neural network layer.

Clause 15: The computing system of any of clauses 12-14, wherein the residual neural network further includes another fully connected layer as an output layer downstream of each other layer in the residual neural network, and wherein the one or more processors are further programmed and/or configured to the residual neural network by: processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

Clause 16: The computing system of any of clauses 12-15, wherein the at least one skip connection includes (i) a first skip connection that directly connects the output of the first fully connected layer to the first other layer downstream of the first recurrent neural network layer in the residual neural network and (ii) a second skip connection that directly connects the output of the first recurrent neural network layer to the second other layer downstream of the second recurrent neural network layer in the residual neural network, wherein the first other layer includes the second recurrent neural network layer, wherein the second other layer includes a second fully connected layer, wherein the first preceding layer includes a first dropout layer between the first recurrent neural network layer and the second recurrent neural network layer, wherein the second preceding layer includes a second dropout layer between the second recurrent neural network layer and the second fully connected layer, and herein the one or more processors are further programmed and/or configured to the residual neural network by: processing, with the first dropout layer, the output of the first recurrent neural network layer; processing, with the second recurrent neural network layer, an output of the first dropout layer and the output of the first fully connected layer received via the first skip connection; processing, with the second dropout layer, an output of the second recurrent neural network layer; and processing, with the second fully connected layer, an output of the second dropout layer and the output of the first recurrent neural network layer received via the second skip connection, wherein the residual neural network produces the output data based on an output of the second fully connected layer.

Clause 17: A computer program product comprising at least one non-transitory computer-readable medium including program instructions that, when executed by at least one processor, cause the at least one processor to: obtain training data; and train a residual neural network including a first fully connected layer, a first recurrent neural network layer, and at least one skip connection, wherein the at least one skip connection directly connects at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, wherein the residual neural network produces output data based on at least one of (i) an output of the first other layer and (ii) an output of the second other layer; and modifying, using a loss function of the residual neural network that depends on the output data, one or more parameters of the residual neural network.

Clause 18: The computer program product of clause 17, wherein the training data includes categorical data, numerical data, and embedding data, wherein the residual neural network further includes a categorical input layer, a numerical input layer, an embedding input layer, and a concatenation layer, and wherein the instructions further cause the at least one processor to train the residual neural network by: processing, with the categorical input layer, the categorical data to produce categorical features; processing, with the numerical input layer, the numerical data to produce numerical features; processing, with the embedding input layer, the embedding data to produce embedding features; processing, with the concatenation layer, the categorical features, the numerical features, and the embedding features to produce a concatenated feature vector; and processing, with the first fully connected layer, the concatenated feature vector.

Clause 19: The computer program product of clauses 17 or 18, wherein the residual neural network further includes a dropout layer downstream of the first recurrent neural network layer in the residual neural network, and wherein the instructions further cause the at least one processor to train the residual neural network by: processing, with the dropout layer, the output of the first recurrent neural network layer.

Clause 20: The computer program product of any of clauses 17-19, wherein the residual neural network further includes another fully connected layer as an output layer downstream of each other layer in the residual neural network, and wherein the instructions further cause the at least one processor to train the residual neural network by: processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

10

Figure 4:
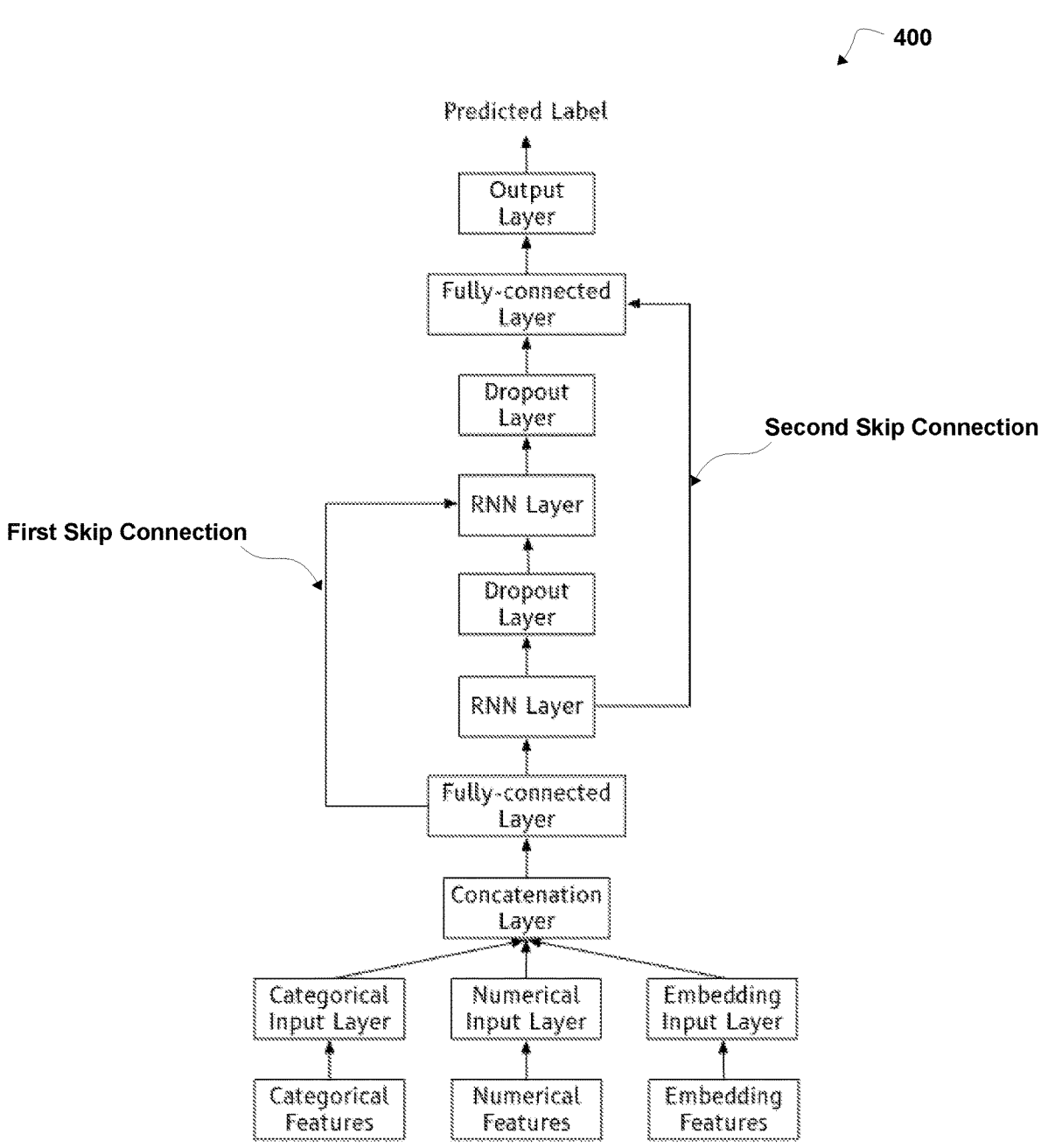
Figure 5:
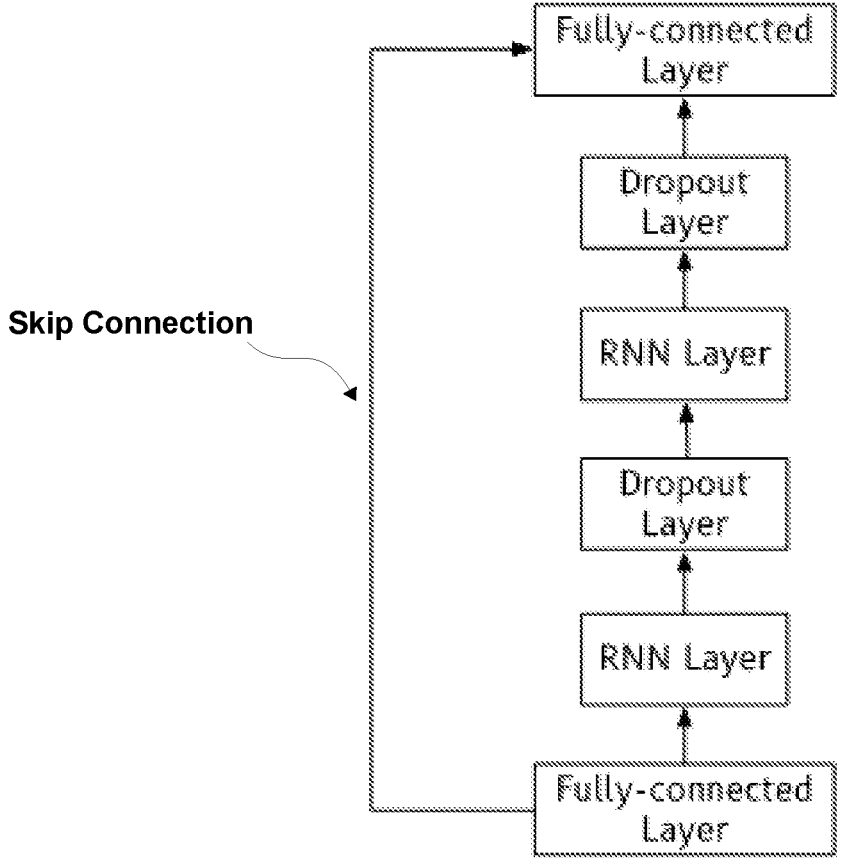
Figure 6:
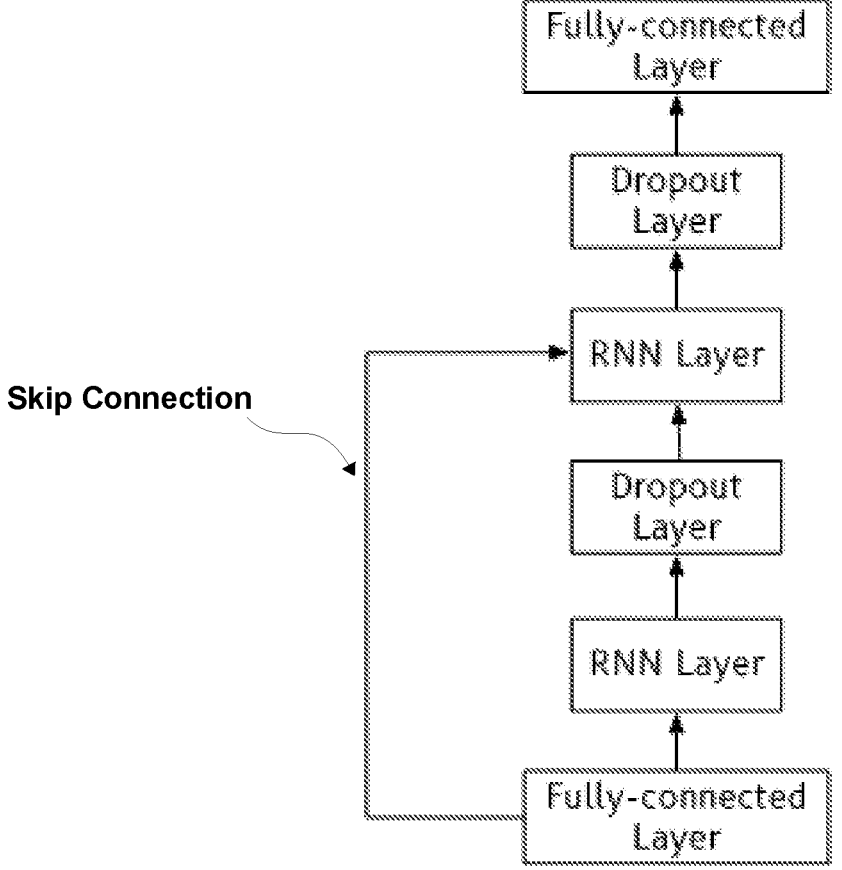
Figure 7:
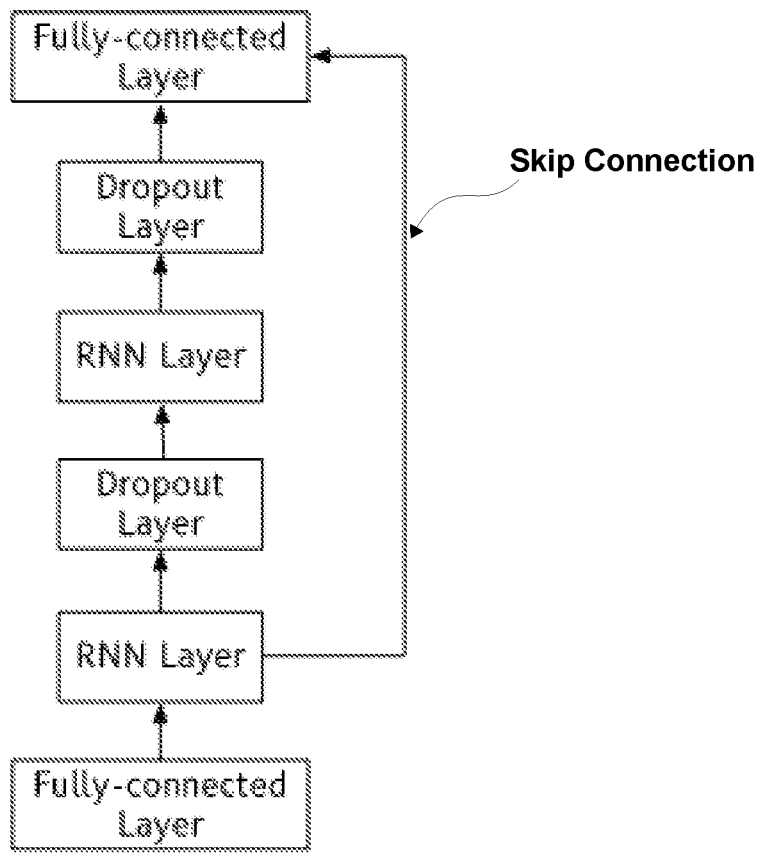
Figure 8:
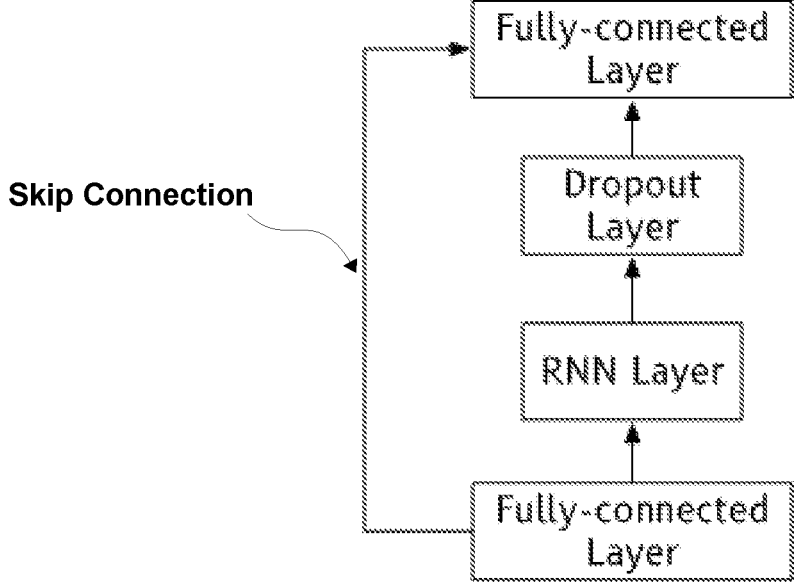

FIG. 4 is a diagram of non-limiting embodiments or aspects of a residual neural network for anomaly detection;

FIG. 5 is a diagram of non-limiting embodiments or aspects of a residual neural network for anomaly detection;

FIG. 6 is a diagram of non-limiting embodiments or aspects of a residual neural network for anomaly detection;

FIG. 7 is a diagram of non-limiting embodiments or aspects of a residual neural network for anomaly detection; and FIG. 8 is a diagram of non-limiting embodiments or aspects of a residual neural network for anomaly detection.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for training, providing, and/or using a residual neural network for anomaly detection. Non-limiting embodiments or aspects of the present disclosure are directed to systems, methods, and computer program products that obtain training data; train a residual neural network including a first fully connected layer, a first recurrent neural network layer, and at least one skip connection, the at least one skip connection directly connecting at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by: processing, with the first fully connected layer, the training data; processing, with the first recurrent neural network layer, the output of the first fully connected layer; at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, wherein the residual neural network produces or generates output data based on at least one of (i) an output of the first other layer and (ii) an output of the second other layer; and modifying, using a loss function of the residual neural network that depends on the output data, one or more parameters of the residual neural network. In this way, non-limiting embodiments or aspects of the present disclosure provide for training, providing, and/or using a residual neural network for anomaly detection that uses a bypass or skip connection to bypass or skip at least one recurrent neural network layer to increase a probability of predicting minority anomaly transactions (e.g., fraudulent transactions, etc.) by capturing information from a categorical dataset that may otherwise be lost due to the minority anomaly transaction being treated as noise.

Figure 1:
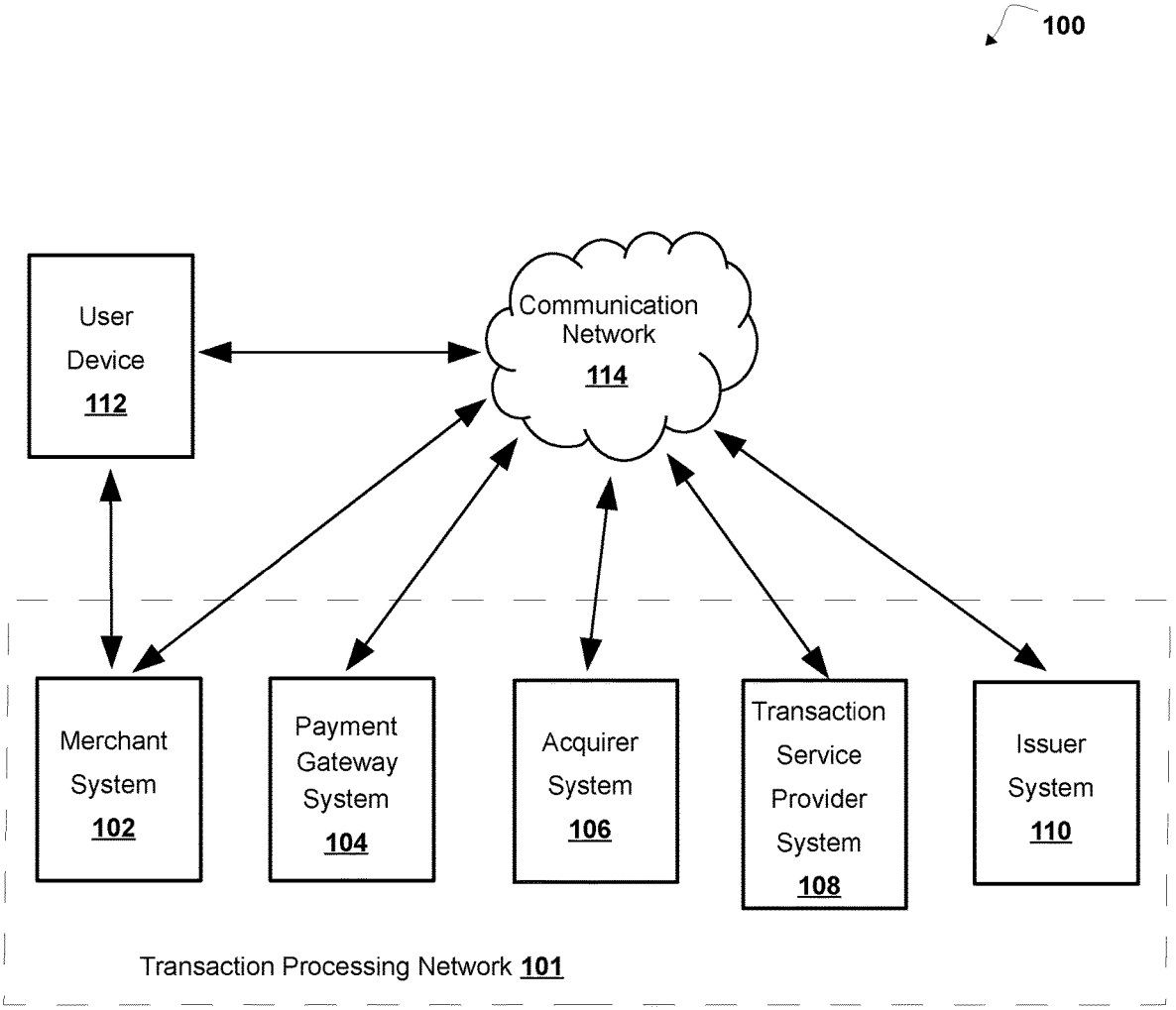
FIG. 1 is a diagram of non-limiting embodiments or aspects of an environment in which systems, devices, products, apparatus, and/or methods, described herein, may be implemented.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 via communication network 114 and/or communicating information and/or data to payment gateway system 104, acquirer system 106, transaction service provider system 108, issuer system 110, and/or user device 112 via communication network 114. Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 via communication network 114 and/or communicating information and/or data to merchant system 102, acquirer system 106, transaction service provider system 108, issuer system 110, and/or user device 112 via communication network 114. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 via communication network 114 and/or communicating information and/or data to merchant system 102, payment gateway system 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 via communication network 114 and/or communicating information and/or data to merchant system 102, payment gateway system 104, acquirer system 106, issuer system 110, and/or user device 112 via communication network 114. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more one or more internal and/or external databases including transaction data.

Issuer system 110 may include one or more devices capable of receiving information and/or data from merchant system 102, payment gateway system 104, acquirer system 106, transaction service provider system 108, and/or user device 112 via communication network 114 and/or communicating information and/or data to merchant system 102, payment gateway system 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 via communication network 114 and/or communicating information and/or data to merchant system 102, payment gateway system 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
FIG. 2 is a diagram of non-limiting embodiments or aspects of components of one or more devices and/or one or more systems of FIG. 1.
Figure 2:
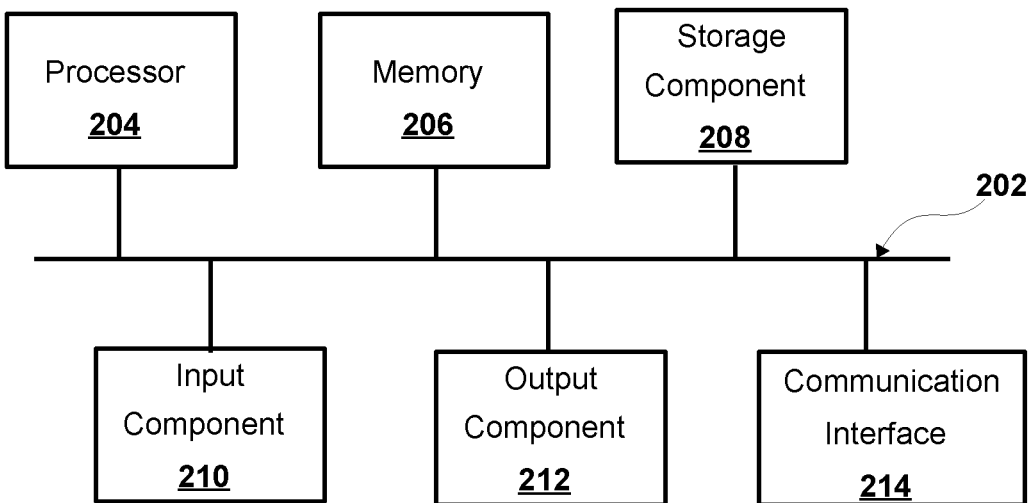

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
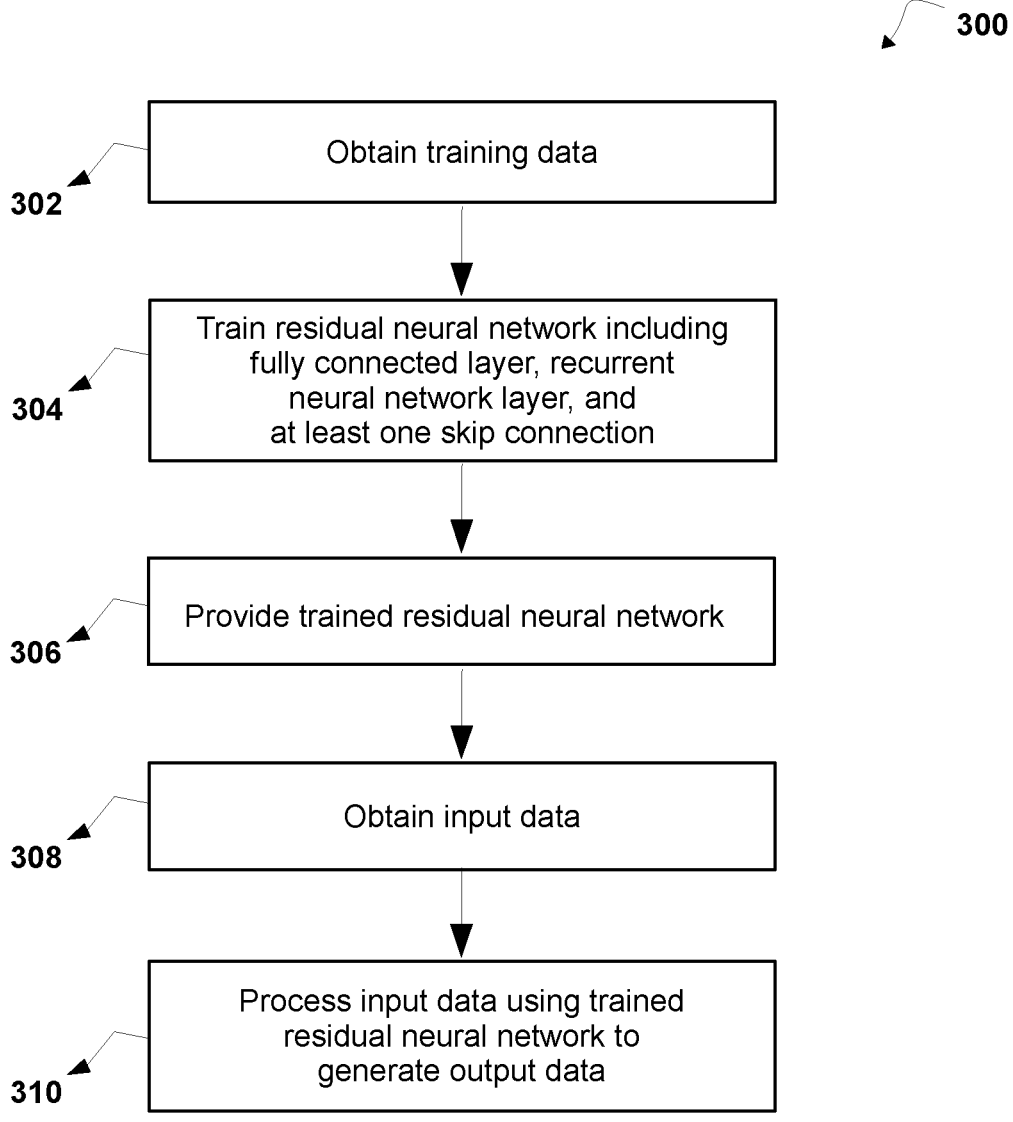
FIG. 3 is a flowchart of non-limiting embodiments or aspects of a process for training, providing, and/or using a residual neural network for anomaly detection.

Referring now to FIG. 3, FIG. 3 is a flowchart of non-limiting embodiments or aspects of a process 300 for training, providing, and/or using a residual neural network for anomaly detection. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining training data. For example, transaction service provider system 108 obtains training data. As an example, transaction service provider system 108 obtains (e.g., receives, retrieves, etc.) training data from one or more databases and/or merchant system 102, payment gateway system 104, acquirer system 106, issuer system 110, and/or user device 112.

In some non-limiting embodiments or aspects, training data includes at least one of the following: categorical data, numerical data, embedding data, or any combination thereof. Categorical data may include a limited, and optionally fixed, number of possible values, in which each individual or other unit of observation is assigned to a particular group or nominal category on the basis of some qualitative property. For example, categorical data may include a merchant category code (MCC). Numerical data may include a numeric value. For example, numerical data may include a transaction amount. Embedding data may include a vector of float point numbers representing certain features. For example, embedding data may represent a merchant name.

In some non-limiting embodiments or aspects, training data, categorical data, numerical data, and/or embedding data may include transaction data. In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a merchant category group (MCG), a MCC, and/or the like. In such an example, MCGs may include general categories under which merchant category codes fall, such as Travel, Lodging, Dining and Entertainment, Vehicle Expenses, Office Services and Merchandise, Cash Advance, Other, and/or the like. In such an example, an MCC is a four-digit number listed in ISO 18245 for retail financial services used to classify a business by the types of goods or services it provides. In some non-limiting embodiments or aspects, transaction data may include parameters associated with payment transaction or transfer between accounts, such as a transfer amount, an account identifier of a transferee account, an account identifier of a transferor account, and/or other transaction data associated with the transferee, the transferor, and/or the payment transaction or transfer.

In some non-limiting embodiments or aspects, training data, categorical data, numerical data, and/or embedding data may include user web browsing data. In some non-limiting embodiments or aspects, user web browsing data may include parameters associated with a user's click-streams on a website. As an example, user web browsing data may include cookies and information and data collected by trackers, such as Google Analytics, and/or the like, that represent a user's electronic interaction with a website.

In some non-limiting embodiments or aspects, training data includes one or more labels (e.g., one or more actual labels, one or more ground truth labels, etc.). For example, training data may include categorical data, numerical data, and/or embedding data associated with one or more transactions and one or more labels for the one or more transactions. As an example, one or more labels for one or more transactions may include an anomaly label indicating that a transaction associated with the label is an anomaly (e.g., a fraud label indicating that a transaction associated with the label is a fraudulent transaction, etc.) and/or a normal label indicating that a transaction associated with the label is a normal transaction (e.g., a non-fraud label indicating that a transaction associated with the label is a non-fraudulent transaction, etc.).

As shown in FIG. 3, at step 304, process 300 includes training a residual neural network including a first fully connected layer, a first recurrent neural network layer, and at least one skip connection. For example, transaction service provider system 108 trains a residual neural network including a first fully connected layer, a first recurrent neural network layer, and at least one skip connection. As an example, transaction service provider system 108 trains a residual neural network including a first fully connected layer, a first recurrent neural network layer, and at least one skip connection with the training data. Further details regarding non-limiting embodiments or aspects of step 304 of process 300 are provided below with regard to FIGS. 4-8.

FIGS. 4-8 are diagrams of non-limiting embodiments or aspects of residual neural networks for anomaly detection. As shown in FIGS. 4-8, the at least one skip connection may directly connect at least one of (i) an output of the first fully connected layer to a first other layer downstream of the first recurrent neural network layer in the residual neural network and (ii) an output of the first recurrent neural network layer to a second other layer downstream of a second recurrent neural network layer in the residual neural network. For example, transaction service provider system 108 may train the residual neural network by processing, with the first fully connected layer, the training data; processing, with the first recurrent neural network layer the output of the first fully connected layer, and at least one of: (i) processing, with the first other layer, the output of the first fully connected layer received via the at least one skip connection and an output of a first preceding layer between the first fully connected layer and the first other layer in the residual neural network and (ii) processing, with the second other layer, the output of the first recurrent neural network layer received via the at least one skip connection and an output of a second preceding layer between the first recurrent neural network layer and the second other layer in the residual neural network, wherein the residual neural network produces or generates output data based on at least one of (i) an output of the first other layer and (ii) an output of the second other layer; and modifying, using a loss function of the residual neural network that depends on the output data, one or more parameters of the residual neural network.

It is noted that without the at least one skip connection, a backpropagating gradient for modifying parameters of the residual neural network flows through the center line shown in FIGS. 4-8, and if flowing back through those center line connections, the backpropagating gradient becomes smaller at each layer and may vanish. However, with the at least one skip connection, a backpropagating gradient may also flow through the at least one skip connection to layers of the residual neural network close to an initial input (e.g., from an output of the residual neural network) so that the back-propagating gradient is less likely to vanish. In some non-limiting embodiments or aspects, a loss function of the residual neural network may only use the at least one skip connection for a backpropagating gradient if a gradient backpropagating via the center path fails to satisfy a thresh-old value (e.g., a threshold value associated with a particular layer of the residual neural network, etc.). For example, the at least one skip connection may be a conditional connec-tion.

In some non-limiting embodiments or aspects, a recurrent neural network layer may include a gated recurrent unit (GRU), a long short-term memory (LSTM), or any combi-nation thereof.

In some non-limiting embodiment or aspects, the residual neural network further includes a dropout layer downstream of the first recurrent neural network layer in the residual neural network. For example, transaction service provider system 108 may train the residual neural network by pro-cessing, with the dropout layer, the output of the first recurrent neural network layer. As an example, the dropout layer may drop out units or connections (e.g., hidden units or connections, visible units or connections, etc.) in the residual neural network. In such an example, the dropout layer may have a probability at which outputs of the layer are dropped out of 20-50% (or inversely, a probability at which outputs of the layer are retained of 50-80%).

In some non-limiting embodiments or aspects, the first other layer may combine the output of the first fully con-nected layer received via the at least one skip connection and the output of the first preceding layer between the first fully connected layer and the first other layer in the residual neural network using addition, bitwise multiplication, or another combination technique before these outputs are processed in the first other layer. In some non-limiting embodiments or aspects, the second other layer may combine the output of the first recurrent neural network layer received via the at least one skip connection and the output of the second preceding layer between the first recurrent neural network layer and the second other layer using addition, bitwise multiplication, or another combination technique before these outputs are processed in the second other layer.

In some non-limiting embodiments or aspects, the first other layer (e.g., as an input of the first other layer, as an output of the first other layer, etc.) has a same number of dimensions as the first fully connected layer (e.g., an input of the first fully connected layer, an output of the first fully connected layer, etc.). In some non-limiting embodiments or aspects, the second other layer (e.g., an input of the second other layer, an output of the second other layer, etc.) has a same number of dimensions as the first recurrent neural network layer (e.g., as an input of the first recurrent neural network layer, as an output of the first recurrent neural network layer, etc.).

Referring now to FIG. 4, in some non-limiting embodi-ments or aspects, a residual neural network further includes a categorical input layer, a numerical input layer, an embed-ding input layer, and a concatenation layer. For example, transaction service provider system 108 may train the residual neural network by processing, with the categorical input layer, the categorical data to produce or generate categorical features (e.g., a categorical feature vector, etc.); processing, with the numerical input layer, the numerical data to produce or generate a numerical feature (e.g., a numerical feature vector, etc.); processing, with the embed-ding input layer, the embedding data to produce or generate embedding features (e.g., an embedding feature vector, etc.); processing, with the concatenation layer, the categorical features, the numerical features, and the embedding features to produce or generate a concatenated feature vector; and processing, with the first fully connected layer, the concat-enated feature vector. As an example, the categorical input layer, the numerical input layer, and/or the embedding input layer may respectively normalize and/or extract features from the categorical data, the numerical data, and/or the embedding data to produce or generate normalized and/or embedded representations of the data, and the concatenation layer may combine the three different types of features into a single concatenated feature vector for input to the first fully connected layer. Although a categorical layer, a numerical input layer, an embedding layer, and a concatenation layer are described primarily with respect to FIG. 4, non-limiting embodiments or aspects are not limited thereto, and a residual neural network according to other non-limiting embodiments or aspects, such as residual neural networks as shown in FIGS. 5-8, and/or the like, may include a categori-cal layer, a numerical input layer, an embedding layer, and/or a concatenation layer.

Still referring to FIG. 4, in some non-limiting embodi-ments or aspects, a residual neural network further includes another fully connected layer as an output layer downstream of each other layer in the residual neural network. For example, transaction service provider system 108 may train the residual neural network by processing, with the output layer, an output of a penultimate layer immediately upstream of the output layer in the residual neural network to produce or generate the output data. In such an example, the output data may include a predicted label. For example, the pre-dicted label may include a probability of the training data being associated with one or more predetermined classifi-cations. In such an example, a number of dimensions of the output layer may be based on a number of desired classes to predict. As an example, the loss function of the residual neural network may depend on the predicted label and an actual label associated with the training data. In such an example, transaction service provider system 108 may modify, using the loss function of the residual neural net-work that depends on the predicted label and the actual label, one or more parameters of the residual neural network.

Although an output layer is described primarily with respect to FIG. 4, non-limiting embodiments or aspects are not limited thereto, and a residual neural network according to other non-limiting embodiments or aspects, such as residual neural networks as shown in FIGS. 5-8, and/or the like, may include an output layer. However, non-limiting embodiments or aspects are not limited thereto, and in some non-limiting embodiments or aspects, a residual neural network, such as residual neural networks shown in FIGS. 4-8, may not include an output layer. For example, a residual neural network according to non-limiting embodiments or aspects that removes the output layer may be used to build user profiles based on transaction data associated with the users input to the residual neural network.

As further shown in FIG. 4, in some non-limiting embodi-ments or aspects, the at least one skip connection includes (i)

a first skip connection that directly connects the output of the first fully connected layer to the first other layer downstream of the first recurrent neural network layer in the residual neural network and (ii) a second skip connection that directly connects the output of the first recurrent neural network layer to the second other layer downstream of the second recurrent neural network layer in the residual neural network. For example, as shown in FIG. 4, the first other layer may include the second recurrent neural network layer, the second other layer may include a second fully connected layer, the first preceding layer may include a first dropout layer between the first recurrent neural network layer and the second recurrent neural network layer, and/or the second preceding layer may include a second dropout layer between the second recurrent neural network layer and the second fully connected layer. In such an example, transaction service provider system 108 may train the residual neural network by processing, with the first dropout layer, the output of the first recurrent neural network layer; processing, with the second recurrent neural network layer, an output of the first dropout layer and the output of the first fully connected layer received via the first skip connection; processing, with the second dropout layer, an output of the second recurrent neural network layer; and processing, with the second fully connected layer, an output of the second dropout layer and the output of the first recurrent neural network layer received via the second skip connection. As an example, the residual neural network may produce or generate the output data based on an output of the second fully connected layer.

Referring now to FIG. 5, in some non-limiting embodiments or aspects, the at least one skip connection directly connects the output of the first fully connected layer to the first other layer downstream of the first recurrent neural network layer in the residual neural network. For example, as shown in FIG. 5, the first other layer may include a second fully connected layer, the residual neural network may further include a first dropout layer between the first recurrent neural network layer and the second recurrent neural network layer, and/or the first preceding layer may include a second dropout layer between the second recurrent neural network layer and the second fully connected layer. In such an example, transaction service provider system 108 may train the residual neural network by processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first fully connected layer received via the at least one skip connection. As an example, the residual neural network may produce or generate the output data based on an output of the second fully connected layer. In such an example, transaction service provider system 108 may modify, using the loss function of the residual neural network that depends on the output data, the one or more parameters of the residual neural network.

Referring now to FIG. 6, in some non-limiting embodiments or aspects, the at least one skip connection directly connects the output of the first fully connected layer to the first other layer downstream of the first recurrent neural network layer in the residual neural network. For example, as shown in FIG. 6, the first other layer may include the second recurrent neural network, the first preceding layer may include a first dropout layer, and/or the residual neural network may further include a second fully connected layer downstream of the second recurrent neural network and a second dropout layer between the second recurrent neural network and the second fully connected layer. In such an example, transaction service provider system 108 may train the residual neural network by processing, with the first dropout layer, the output of the first recurrent neural network layer; processing, with the second recurrent neural network layer, an output of the first dropout layer and the output of the first fully connected layer received via the at least one skip connection; processing, with the second dropout layer, an output of the second recurrent neural network layer; and processing, with the second fully connected layer, an output of the second dropout layer. As an example, the residual neural network may produce or generate the output data based on an output of the second fully connected layer. In such an example, transaction service provider system 108 may modify, using the loss function of the residual neural network that depends on the output data, the one or more parameters of the residual neural network.

Referring now to FIG. 7, in some non-limiting embodiments or aspects, the at least one skip connection directly connects the output of the first recurrent neural network layer to the second other layer downstream of the second recurrent neural network layer in the residual neural network. For example, as shown in FIG. 7, the second other layer may include a second fully connected layer, the residual neural network may further include a first dropout layer between the first recurrent neural network and the second recurrent neural network, and/or the second preceding layer may include a second dropout layer. In such an example, transaction service provider system 108 may train the residual neural network by processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first recurrent neural network layer received via the at least one skip connection. As an example, the residual neural network produces or generates the output data based on an output of the second fully connected layer. In such an example, transaction service provider system 108 may modify, using the loss function of the residual neural network that depends on the output data, the one or more parameters of the residual neural network.

Referring now to FIG. 8, in some non-limiting embodiments or aspects, the at least one skip connection directly connects the output of the first fully connected layer to the first other layer downstream of the first recurrent neural network layer in the residual neural network. For example, as shown in FIG. 8, the first other layer may include a second fully connected layer, the residual neural network may further include a first dropout layer between the first recurrent neural network layer and the second fully connected layer, and/or first recurrent neural network layer may be the only recurrent neural network in the residual neural network (e.g., the residual neural network may include a single recurrent neural network layer, etc.). In such an example, transaction service provider system 108 may train the residual neural network by processing, with the first dropout layer, the output of the first recurrent neural network layer; and processing, with the second fully connected layer, an output of the first dropout layer and the output of the first fully connected layer received via the at least one skip connection. As an example, the residual neural network may produce or generate the output data based on an output of the second fully connected layer. In such an example, transaction service provider system 108 may modify, using the loss function of the residual neural network that depends on the output data, the one or more parameters of the residual neural network.

As shown in FIG. 3, at step 306, process 300 includes providing the trained residual neural network. For example, transaction service provider system 108 provides the trained residual neural network. As an example, transaction service provider system 108 provides the trained residual neural network that includes the one or more parameters that have been modified based on the loss function of the residual neural network that depends on the output data. In some non-limiting embodiments or aspects, transaction service provider system 108 provides the trained residual neural network at transaction service provider system 108 and/or to merchant system 102, payment gateway system 104, acquirer system 106, issuer system 110, and/or user device 112.

As shown in FIG. 3, at step 308, process 300 includes obtaining input data. For example, transaction service provider system 108 obtains input data. As an example, transaction service provide system obtains (e.g., receives, retrieves, etc.) input data from one or more databases and/or merchant system 102, payment gateway system 104, acquirer system 106, issuer system 110, and/or user device 112.

As shown in FIG. 3, at step 310, process 300 includes processing, using the trained residual neural network, the input data to generate output data. For example, transaction service provider system 108 processes, using the trained residual neural network, the input data to generate output data.

In some non-limiting embodiments or aspects, input data includes transaction data associated with a transaction, and output data includes a prediction of whether the transaction is a fraudulent transaction. For example, input data may include a request to authorize a transaction between a merchant and an account holder on an account issued by an issuer (e.g., transaction data, parameters associated with the transaction etc.), and the output data may include a prediction of whether the transaction is a fraudulent transaction (or a normal non-fraudulent transaction). Although payment transactions are described primarily herein as payment transactions between a merchant and an account, non-limiting embodiments or aspects are not limited thereto and a payment transaction may include a payment transaction or transfer between accounts (e.g., a peer-to-peer payment transaction or transfer, a peer-to-peer loan, etc.) or any other payment-related transaction. Further, although transactions are described primarily herein as payment transactions, non-limiting embodiments or aspects are not limited thereto and a transaction may include any type of activity or event for which training data and/or input data is obtained.

In some non-limiting embodiments or aspects, input data includes transaction data associated with one or more transactions for an account holder, and output data includes an account or user profile associated with the account holder.

In some non-limiting embodiments or aspects, input data includes user web browsing data associated with a web browsing session or activity, and output data may include a prediction of whether the web browsing session or activity is bot traffic (or normal human web browsing). Human behavior may be different than software bot behavior. For example, user web browsing data associated with a human user accessing a website (e.g., parameters associated with a user's clickstreams on a website, etc.) may be different than user web browsing data associated with a software bot accessing the website (e.g., parameters associated with the software bot's clickstreams on a website, etc. As an example, a human attempting to book a hotel on a website may check available hotel bookings associated with a specific date, a specific location, and/or the like. In contrast, a software bot may attempt to go through all available data, for example, to continuously check a price, and/or attempt to determine what is behind the website and/or to find a way to attack the website. In this way, there may be differences in the type of data that is accessed, differences in the frequency at which the data is accessed, and/or differences in the time at which the data is accessed. Accordingly, a trained residual neural network according to non-limiting embodiments or aspects may be used to process input data including user web browsing data associated with a web browsing session or activity to generate output data including a prediction of whether the web browsing session or activity is anomalous or fraudulent software bot traffic. In such an example, in response to determining that the web browsing session or activity is anomalous or fraudulent software bot traffic, transaction service provider system 108 may alert a network administrator and/or automatically block web traffic associated with the software bot (e.g., block web traffic associated with an IP address associated with the software bot, etc.)

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with at least one processor, training data; and
   training, with at least one processor, a residual neural network including a first fully connected layer, a first recurrent neural network layer, and skip connections, wherein the skip connections directly connects (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by:
   processing, with the first fully connected layer, the training data;
   processing, with the first recurrent neural network layer, the output of the first fully connected layer;
   (i) processing, with the first other layer, the output of the first fully connected layer received via the skip connection and an output of a first preceding layer between the first fully connected layer and the first other layer in the residual neural network and (ii) processing, with the second other layer, the output of the first recurrent neural network layer received via the skip connection and an output of a second preceding layer between the first recurrent neural network layer and the second other layer in the residual neural network, wherein the residual neural network produces output data based on (i) an output of the first other layer and (ii) an output of the second other layer; and modifying, using a loss function of the residual neural network that depends on the output data, one or more parameters of the residual neural network.

2. The computer-implemented method of claim 1, wherein the training data includes categorical data, numerical data, and embedding data, wherein the residual neural network further includes a categorical input layer, a numerical input layer, an embedding input layer, and a concatenation layer, and wherein training the residual neural network includes:

processing, with the categorical input layer, the categorical data to produce categorical features;

processing, with the numerical input layer, the numerical data to produce numerical features;

processing, with the embedding input layer, the embedding data to produce embedding features;

processing, with the concatenation layer, the categorical features, the numerical features, and the embedding features to produce a concatenated feature vector; and processing, with the first fully connected layer, the concatenated feature vector.

3. The computer-implemented method of claim 1, wherein the residual neural network further includes a dropout layer downstream of the first recurrent neural network layer in the residual neural network, and wherein training the residual neural network includes: processing, with the dropout layer, the output of the first recurrent neural network layer.

4. The computer-implemented method of claim 1, wherein the residual neural network further includes another fully connected layer as an output layer downstream of each other layer in the residual neural network, and wherein training the residual neural network includes:

processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

5. The computer-implemented method of claim 1, wherein the skip connections includes (i) a first skip connection that directly connects the output of the first fully connected layer to the first other layer downstream of the first recurrent neural network layer in the residual neural network and (ii) a second skip connection that directly connects the output of the first recurrent neural network layer to the second other layer downstream of the second recurrent neural network layer in the residual neural network, wherein the first other layer includes the second recurrent neural network layer, wherein the second other layer includes a second fully connected layer, wherein the first preceding layer includes a first dropout layer between the first recurrent neural network layer and the second recurrent neural network layer, wherein the second preceding layer includes a second dropout layer between the second recurrent neural network layer and the second fully connected layer, and wherein training the residual neural network further includes:

processing, with the first dropout layer, the output of the first recurrent neural network layer;

processing, with the second recurrent neural network layer, an output of the first dropout layer and the output of the first fully connected layer received via the first skip connection;

processing, with the second dropout layer, an output of the second recurrent neural network layer; and processing, with the second fully connected layer, an output of the second dropout layer and the output of the first recurrent neural network layer received via the second skip connection, wherein the residual neural network produces the output data based on an output of the second fully connected layer.

6. The computer-implemented method of claim 1, wherein the skip connections directly connects the output of the first fully connected layer to the first other layer downstream of the first recurrent neural network layer in the residual neural network, wherein the first other layer includes a second fully connected layer, wherein the residual neural network further includes a first dropout layer between the first recurrent neural network layer and the second recurrent neural network layer, wherein the first preceding layer includes a second dropout layer between the second recurrent neural network layer and the second fully connected layer, and wherein training the residual neural network further includes: processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first fully connected layer received via the skip connections, wherein the residual neural network produces the output data based on an output of the second fully connected layer.

7. The computer-implemented method of claim 1, wherein the skip connections directly connects the output of the first fully connected layer to the first other layer downstream of the first recurrent neural network layer in the residual neural network, wherein the first other layer includes the second recurrent neural network, wherein the first preceding layer includes a first dropout layer, wherein the residual neural network further includes a second fully connected layer downstream of the second recurrent neural network and a second dropout layer between the second recurrent neural network and the second fully connected layer, and wherein training the residual neural network further includes: processing, with the first dropout layer, the output of the first recurrent neural network layer; processing, with the second recurrent neural network layer, an output of the first dropout layer and the output of the first fully connected layer received via the skip connection; processing, with the second dropout layer, an output of the second recurrent neural network layer; and processing, with the second fully connected layer, an output of the second dropout layer, wherein the residual neural network produces the output data based on an output of the second fully connected layer.

8. The computer-implemented method of claim 1, wherein the skip connections directly connects the output of the first recurrent neural network layer to the second other layer downstream of the second recurrent neural network layer in the residual neural network, wherein the second other layer includes a second fully connected layer, wherein the residual neural network further includes a first dropout layer between the first recurrent neural network and the second recurrent neural network, wherein the second preceding layer includes a second dropout layer, and wherein training the residual neural network further includes: processing, with the first dropout layer, the output of the first recurrent neural network layer; processing, with the second recurrent neural network layer, an output of the first dropout layer; processing, with the second dropout layer, an output of the second recurrent neural network layer; and processing, with the second fully connected layer, an output of the second dropout layer and the output of the first recurrent neural network layer received via the skip connections, wherein the residual neural network produces the output data based on an output of the second fully connected layer.

9. The computer-implemented method of claim 1, wherein the skip connections directly connects the output of the first fully connected layer to the first other layer downstream of the first recurrent neural network layer in the residual neural network, wherein the first other layer includes a second fully connected layer, wherein the residual neural network further includes a first dropout layer between the first recurrent neural network layer and the second fully connected layer, wherein first recurrent neural network layer is the only recurrent neural network in the residual neural network, and wherein training the residual neural network further includes: processing, with the first dropout layer, the output of the first recurrent neural network layer; and processing, with the second fully connected layer, an output of the first dropout layer and the output of the first fully connected layer received via the skip connections, wherein the residual neural network produces the output data based on an output of the second fully connected layer.

10. The computer-implemented method of claim 1, further comprising: providing, with at least one processor, the trained residual neural network; obtaining, with at least one processor, input data; and processing, with at least one processor, using the trained residual neural network, the input data to generate output data.

11. The computer-implemented method of claim 9, wherein the input data includes a request to authorize a transaction between a merchant and an account holder on an account issued by an issuer, and wherein the output data includes a prediction of whether the transaction is a fraudulent transaction.

12. A computing system comprising:
one or more processors programmed and/or configured to:
  obtain training data; and
  train a residual neural network including a first fully connected layer, a first recurrent neural network layer, and skip connections, wherein the skip connections directly connects (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by:
    processing, with the first fully connected layer, the training data;
    processing, with the first recurrent neural network layer, the output of the first fully connected layer;
    (i) processing, with the first other layer, the output of the first fully connected layer received via the skip connection and an output of a first preceding layer between the first fully connected layer and the first other layer in the residual neural network and
(ii) processing, with the second other layer, the output of the first recurrent neural network layer received via the skip connection and an output of a second preceding layer between the first recurrent neural network layer and the second other layer in the residual neural network, wherein the residual neural network produces output data based on (i) an output of the first other layer and (ii) an output of the second other layer; and
modifying, using a loss function of the residual neural network that depends on the output data, one or more parameters of the residual neural network.

13. The computing system of claim 12, wherein the training data includes categorical data, numerical data, and embedding data, wherein the residual neural network further includes a categorical input layer, a numerical input layer, an embedding input layer, and a concatenation layer, and wherein the one or more processors are further programmed and/or configured to the residual neural network by:
processing, with the categorical input layer, the categorical data to produce categorical features;
processing, with the numerical input layer, the numerical data to produce numerical features;
processing, with the embedding input layer, the embedding data to produce embedding features;
processing, with the concatenation layer, the categorical features, the numerical features, and the embedding features to produce a concatenated feature vector; and
processing, with the first fully connected layer, the concatenated feature vector.

14. The computing system of claim 12, wherein the residual neural network further includes a dropout layer downstream of the first recurrent neural network layer in the residual neural network, and wherein the one or more processors are further programmed and/or configured to the residual neural network by: processing, with the dropout layer, the output of the first recurrent neural network layer.

15. The computing system of claim 12, wherein the residual neural network further includes another fully connected layer as an output layer downstream of each other layer in the residual neural network, and wherein the one or more processors are further programmed and/or configured to the residual neural network by:
processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

16. The computing system of claim 12, wherein the skip connections includes (i) a first skip connection that directly connects the output of the first fully connected layer to the first other layer downstream of the first recurrent neural network layer in the residual neural network and (ii) a second skip connection that directly connects the output of the first recurrent neural network layer to the second other layer downstream of the second recurrent neural network layer in the residual neural network, wherein the first other layer includes the second recurrent neural network layer, wherein the second other layer includes a second fully connected layer, wherein the first preceding layer includes a first dropout layer between the first recurrent neural network layer and the second recurrent neural network layer, wherein the second preceding layer includes a second dropout layer between the second recurrent neural network layer and the second fully connected layer, and herein the one or more processors are further programmed and/or configured to the residual neural network by:

processing, with the first dropout layer, the output of the first recurrent neural network layer;

processing, with the second recurrent neural network layer, an output of the first dropout layer and the output of the first fully connected layer received via the first skip connection;

processing, with the second dropout layer, an output of the second recurrent neural network layer; and processing, with the second fully connected layer, an output of the second dropout layer and the output of the first recurrent neural network layer received via the second skip connection, wherein the residual neural network produces the output data based on an output of the second fully connected layer.

17. A computer program product comprising at least one non-transitory computer-readable medium including program instructions that, when executed by at least one processor, cause the at least one processor to:

obtain training data; and train a residual neural network including a first fully connected layer, a first recurrent neural network layer, and skip connections, wherein the skip connections directly connects (i) an output of the first fully connected layer to a first other layer downstream of the first recurrent neural network layer in the residual neural network and (ii) an output of the first recurrent neural network layer to a second other layer downstream of a second recurrent neural network layer in the residual neural network, by:

processing, with the first fully connected layer, the training data;

processing, with the first recurrent neural network layer, the output of the first fully connected layer;

(i) processing, with the first other layer, the output of the first fully connected layer received via the skip connection and an output of a first preceding layer between the first fully connected layer and the first other layer in the residual neural network and (ii) processing, with the second other layer, the output of the first recurrent neural network layer received via the kip connection and an output of a second preceding layer between the first recurrent neural network layer and the second other layer in the residual neural network, wherein the residual neural network produces output data based on (i) an output of the first other layer and (ii) an output of the second other layer; and modifying, using a loss function of the residual neural network that depends on the output data, one or more parameters of the residual neural network.

18. The computer program product of claim 17, wherein the training data includes categorical data, numerical data, and embedding data, wherein the residual neural network further includes a categorical input layer, a numerical input layer, an embedding input layer, and a concatenation layer, and wherein the instructions further cause the at least one processor to train the residual neural network by:

processing, with the categorical input layer, the categorical data to produce categorical features;

processing, with the numerical input layer, the numerical data to produce numerical features;

processing, with the embedding input layer, the embedding data to produce embedding features;

processing, with the concatenation layer, the categorical features, the numerical features, and the embedding features to produce a concatenated feature vector; and processing, with the first fully connected layer, the concatenated feature vector.

19. The computer program product of claim 17, wherein the residual neural network further includes a dropout layer downstream of the first recurrent neural network layer in the residual neural network, and wherein the instructions further cause the at least one processor to train the residual neural network by: processing, with the dropout layer, the output of the first recurrent neural network layer.

20. The computer program product of claim 17, wherein the residual neural network further includes another fully connected layer as an output layer downstream of each other layer in the residual neural network, and wherein the instructions further cause the at least one processor to train the residual neural network by:

processing, with the output layer, an output of a penultimate layer immediately upstream of the output layer in the residual neural network to produce the output data, wherein the output data includes a predicted label, wherein the predicted label includes a probability of the training data being associated with one or more predetermined classifications, and wherein the loss function of the residual neural network depends on the predicted label and an actual label associated with the training data.

\* \* \* \* \*